Nov. 24, 1931. W. MATUSKEY 1,833,614
LIFE SAVING BELT
Filed Jan. 26, 1931
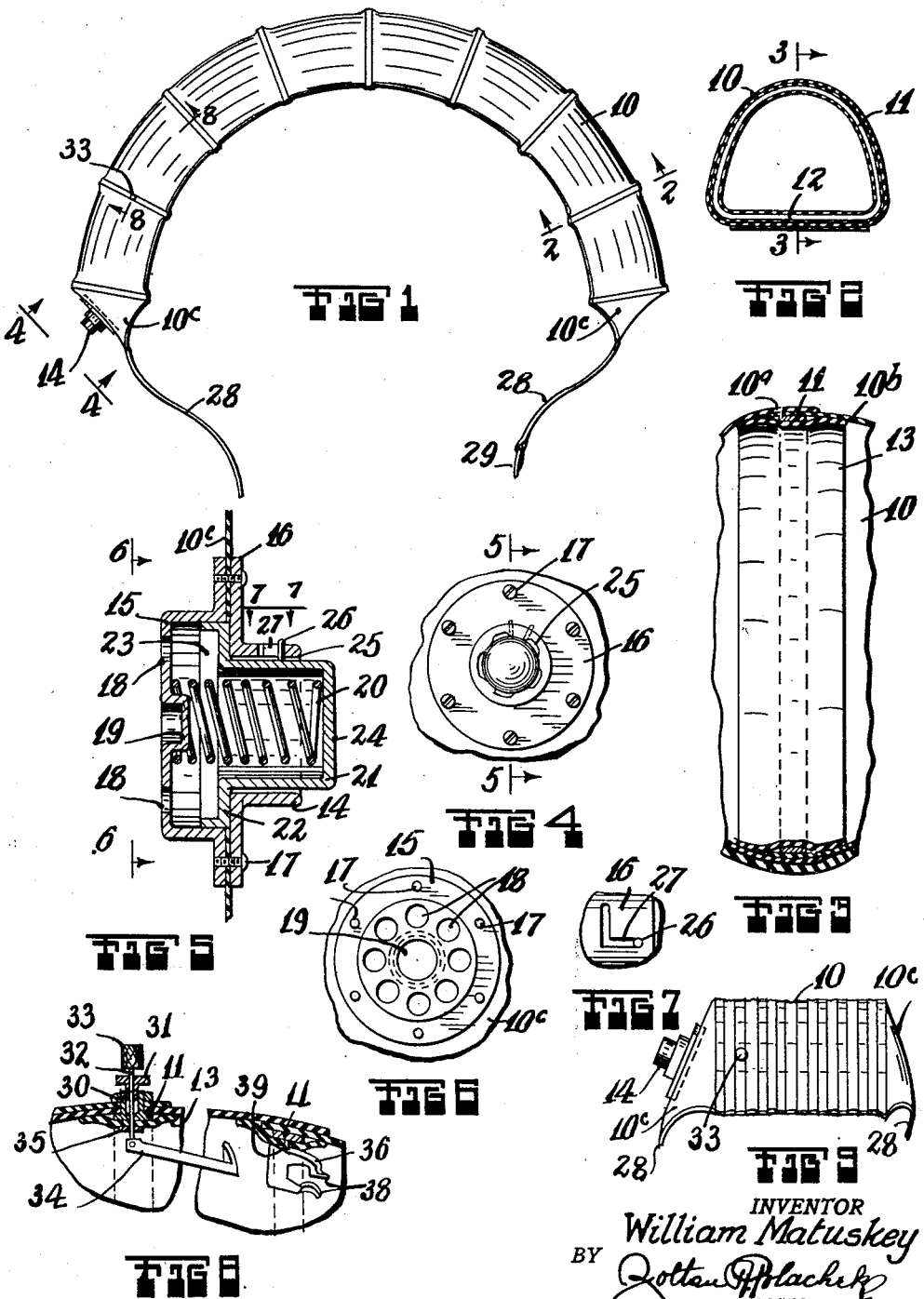
INVENTOR
William Matuskey
BY
ATTORNEY Patented Nov. 24, 1931

1,833,614

UNITED STATES PATENT OFFICE

WILLIAM MATUSKEY, OF NEW YORK, N. Y.

LIFE SAVING BELT

Application filed January 26, 1931. Serial No. 511,163.

This invention relates to new and useful improvements in a life saving belt.

The invention has for an object the provision of a life saving belt which is characterized by an arcuate shaped waterproof accordion casing with a plurality of transverse spaced ribs to hold the casing from collapsing transversely.

A still further object of this invention is to provide a valve at one end of the casing to allow the entrance of air within the casing automatically when the casing is drawn to its open position and to allow further inflation through the same valve.

A still further object of the invention is to construct the casing of several sections amalgamated together.

Another object of this invention is the provision of straps at the ends of the casing serving for the attachment of the life belt upon a wearer. Means for connecting the straps together may also be provided on them.

As a further object of this invention it is proposed to provide means to hold the valve open during the collapsing of the casing as when the device is to be stored away.

Another object is to provide means for shortening the length of the casing so that the belt fits children as well as grown ups.
It is particularly proposed to provide a means to hold adjacent ribs together to accomplish the shortening of the casing.

And a still further object of this invention is to construct a life saving belt which is of simple durable construction, dependable in use and efficient in action, and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is a plan view of a belt constructed according to this invention.

Fig. 2 is an enlarged transverse sectional view taken on the line 2—2 of Fig. 1.

Fig. 3 is a fragmentary enlarged sectional view taken on the line 3—3 of Fig. 2.

Fig. 4 is a fragmentary elevational view looking in the direction of the line 4—4 of Fig. 1.

Fig. 5 is a fragmentary enlarged sectional view taken on the line 5—5 of Fig. 4.

Fig. 6 is a fragmentary elevational view looking in the direction of the line 6—6 of Fig. 5.

Fig. 7 is a fragmentary elevational view looking in the direction of the line 7—7 of Fig. 5.

Fig. 8 is a fragmentary enlarged detailed sectional view taken on the line 8—8 of Fig 1.

Fig. 9 is a view of the life saving belt in a collapsed condition.

The life saving belt comprises an arcuate shaped waterproof casing 10 of accordion construction, which is closed at both ends. The casing 10 preferably should be made from rubberized cloth or other similar material 1. As shown on the drawings, it is constructed from several sections amalgamated together. In Fig. 3 particularly a pair of adjacent sections have been illustrated and indicated by reference numerals 10$^a$ and 10$^b$ respectively. The ends of these sections overlap each other and then the overlapped portion is amalgamated by the use of glue, cement or the like. The ends of the casing 10$^c$ are constructed of substantially cone shape.

A plurality of transverse flexible ribs 11 are spaced within the casing and serve to hold the casing transversely opened. The ribs 11 are of substantially semi-elliptical shape in transverse elevation, as may be gathered from inspecting Fig. 2. They also have a flat side 12 for resting against a wearer's body. The ribs 11 are uniformly spaced throughout the length of the casing and are held in transverse positions by reason of a plurality of transverse holding straps 13. These straps are slightly broader than the ribs, as may be seen from inspecting Fig. 3, and have their edges amalgamated down upon the inside of the casing. To reinforce the joint between the casing sections 10$^a$ and 10$^b$, the straps 13 should be placed so as to extend over the inside of the joint and have their opposite edges respectively attached to each of the casing sections. This serves to reinforce and hold the connection between the sections.

To allow the entrance of air within the casing 10, a valve 14 is mounted upon one of its ends. This valve 14 comprises an inner casing 15 connected to an outer casing 16 by screws 17 or the like. The outer casing is positioned on the outside of the casing 10, while the inner casing 15 is positioned within. The inner casing 15 is of cup shape and its bottom end is provided with a plurality of apertures 18 for the passage of air. The cone shaped end 10$^c$ of the casing 10 is provided with an aperture so that air from the exterior may enter through apertures 18 within the casing 10. A boss 19 projects from the base of the casing 15 and serves to support one end of an expansion spring 20. The other end of this spring acts against a valve head 21.

The valve head 21 has a seat portion 22 which acts against the inside of the casing section 16. The seat 22 terminates in a serrated flange 23 so that when the valve head is depressed to move off its seat, the air may pass freely. The valve 21 has a projecting end 24 which extends from an open portion of the casing 16 so that it may be manually depressed. The opened portion of the casing 16 is formed with a plurality of longitudinal slots 25 allowing for the passage of air around the projecting end of the valve head.

A means is also provided for holding the valve 21 in an opened position when this is desired. This means is in the form of a pin 26 which projects from the valve 21 through a bayonet slot 27 formed in the casing 16. This slot is so positioned that it has a longitudinal portion in which the pin 26 normally engages to allow depression of the valve head and a transverse portion, so that the valve head may be slightly turned to move the pin 26 therein and hold the valve in its opened position.

In order to attach the belt upon a wearer, it is provided with straps 28 on the cone shaped ends 10$^c$. A conventional buckle 29 is mounted upon one of the free ends of the strap to engage with the other strap to accomplish the attachment as desired. In Fig. 9 the belt is shown in a completely collapsed condition. In this manner the belt may be stored. When it becomes necessary to use it, it may be manually gripped at each end or by the straps 28 and drawn apart. The accordion pleats of the casing are then opened and automatically air will suck into the casing through the valve 21. It should be noticed that as the casing is drawn open, suction within the casing will cause the valve to move inwards so that air may enter through the openings 25 and the openings 18 within the casing. When this air again wishes to leave, the valve is automatically forced upon its seat so as to entrap it. To obtain additional inflation, one may blow into the opened end of the outer casing 16.

A means is also provided for shortening the length of the casing to adapt it to fit children or grown ups. This means includes a means for holding adjacent ribs 11 together when desired. It is shown in detail in Fig. 8 wherein one of the ribs 11 is shown with a tubular projection 30 connected with a packing gland 31. A stem 32 engages through the packing gland and through the rib 11 to the interior of the belt. A handle 33 is fixed upon the outer end of the stem. A hook 34 is fixed upon the inner end of the stem. A washer 35 upon the stem 32 between the hook 34 and the covering strip 13 serves to prevent undue wearing out of the parts.

The construction on an adjacent rib 11 for coacting with the hook 34 to connect the parts together consists of a catch 36 supported by a stem 39 upon the inside of the rib 11. This catch has resilient fingers 38 to allow the interengagement of the hook 34. In the normal collapsed condition of the belt, the handle 33 may be turned for causing the hook 34 to engage in or out from the catch 36. Assume that the belt is to be used upon a child and it is necessary to decrease its length. Then the handle 33 is turned to engage the hook 34 with the catch. Thereafter, when the belt is drawn to its opened condition, the ribs which have been connected together cannot move apart so that the belt cannot expand in this particular region. This serves to shorten its operative length. It should be understood that several hooks and catches, as illustrated in Fig. 8, may be used on one belt. For example, considering Fig. 1, another arrangement similar to Fig. 8 may be upon the rear side of the belt so that the ribs which are connected together will be held at both sides. In addition, similar catches may be arranged between other of the ribs 11 so as to change the amplitude of possible adjustment of the belt.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A life saving belt, comprising an arcuate shaped waterproof casing of accordion construction closed at both ends, a plurality of transverse flexible ribs spaced within said casing to hold the casing transversely opened and having a flat side to rest against a wearer's body, a valve on one end of said casing, and straps at both ends of said casing for its attachment on one's body, said casing being formed from separate sections having overlapping ends amalgamated together.

2. A life saving belt, comprising an arcuate shaped waterproof casing of accordion construction closed at both ends, a plurality of transverse flexible ribs spaced within said casing to hold the casing transversely opened and having a flat side to rest against a wearer's body, a valve on one end of said casing, and straps at both ends of said casing for its attachment on one's body, said casing being formed from separate sections having overlapping ends amalgamated together, a transverse covering strap being engaged over the inner sides of each of the ribs and is so located that its edges extend over adjacent casing sections, and these edges being amalgamated onto the casing sections so as to reinforce the joint between the sections.

3. A life saving belt, comprising an arcuate shaped waterproof casing of accordion construction closed at both ends, a plurality of transverse flexible ribs spaced within said casing to hold the casing transversely opened and having a flat side to rest against a wearer's body, a valve on one end of said casing, and straps at both ends of said casing for its attachment on one's body, said valve having a spring pressed valve head normally urged upon its seat so as to restrain the passage of air from the interior to the exterior of the casing, said valve head being otherwise free so as to automatically move to an open position to allow the entrance of air within the casing when the casing is expanded.

4. A life saving belt, comprising an arcuate shaped waterproof casing of accordion construction closed at both ends, a plurality of transverse flexible ribs spaced within said casing to hold the casing transversely opened and having a flat side to rest against a wearer's body, a valve on one end of said casing, and straps at both ends of said casing for its attachment on one's body, said valve having a spring pressed valve head normally urged upon its seat so as to restrain the passage of air from the interior to the exterior of the casing, said valve head being otherwise free so as to automatically move to an open position to allow the entrance of air within the casing when the casing is expanded, and a means being also provided for latching the valve head in its open position.

5. A life saving belt, comprising an arcuate shaped waterproof casing of accordion construction closed at both ends, a plurality of transverse flexible ribs spaced within said casing to hold the casing transversely opened and having a flat side to rest against a wearer's body, a valve on one end of said casing, and straps at both ends of said casing for its attachment on one's body, said valve having a spring pressed valve head normally urged upon its seat so as to restrain the passage of air from the interior to the exterior of the casing, said valve head being otherwise free so as to automatically move to an open position to allow the entrance of air within the casing when the casing is expanded, and a means being also provided for latching the valve head in its open position, comprising a pin projecting from the valve head and working in a bayonet slot in the casing of the valve.

6. A life saving belt, comprising an arcuate shaped waterproof casing of accordion construction closed at both ends, a plurality of transverse flexible ribs spaced within said casing to hold the casing transversely opened and having a flat side to rest against a wearer's body, a valve on one end of said casing, straps at both ends of said casing for its attachment to one's body, and means for shortening the length of the casing so as to adapt it for use on children or grown ups, comprising a stem engaged through one of the said ribs, air tight means for rotatively supporting said stem, a hook on the inner end of the stem, and a catch on an adjacent rib for interengagement with said hook while the belt is in its collapsed condition so as to hold the ribs together when the belt is drawn open.

In testimony whereof I have affixed my signature.

WILLIAM MATUSKEY.